Feb. 6, 1962   C. J. MORRELLO   3,019,831
PNEUMATIC TIRE-FILLING DEVICE
Filed Nov. 16, 1959
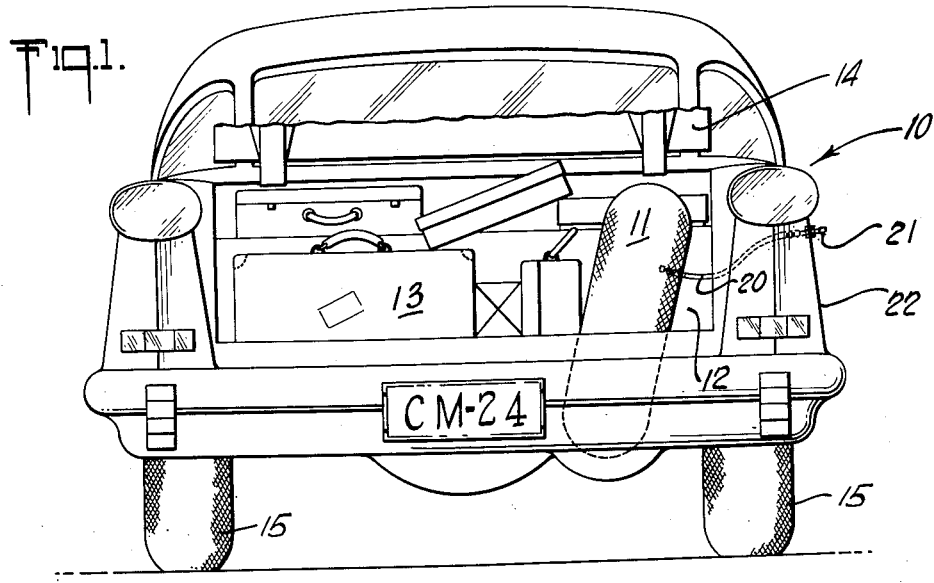
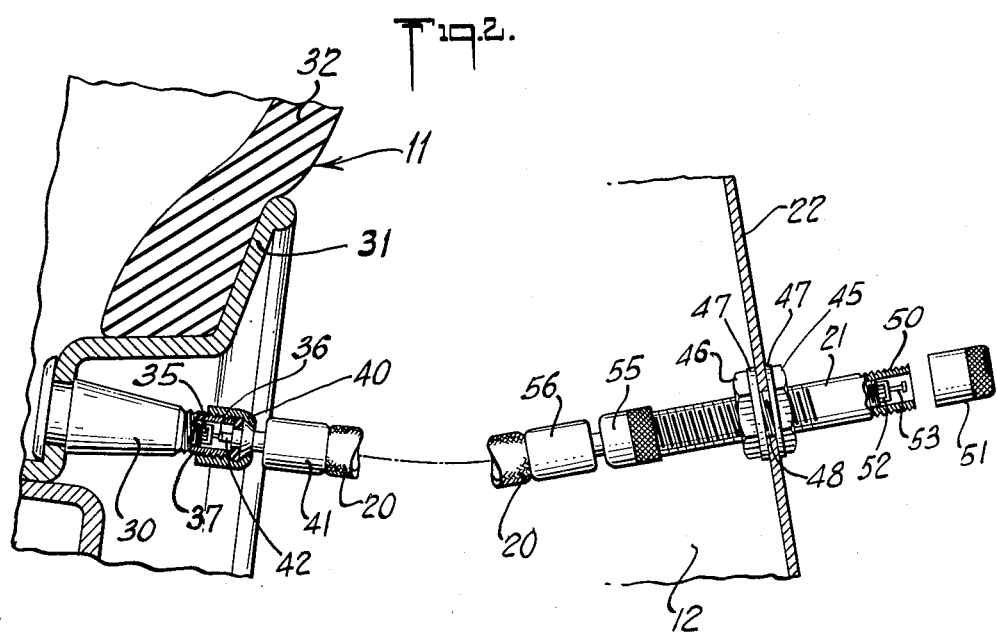
INVENTOR
CHARLES J. MORRELLO
BY
Green Maréchal Jr.
ATTORNEY

United States Patent Office 3,019,831
PNEUMATIC TIRE-FILLING DEVICE
Charles J. Morrello, 2 Tudor City Place, New York, N.Y.
Filed Nov. 16, 1959, Ser. No. 853,083
2 Claims. (Cl. 152—415)

This invention relates to pneumatic tire filling devices for use in connection with automobiles and, more particularly, to a device accessible from the outside of an automobile for interjecting air into a spare time enclosed within the luggage compartment of the automobile.

As is well understood, the spare tire of many, if not most, modern automobiles is carried enclosed within the luggage compartment or otherwise enclosed within the automobile. As a result of such enclosure, particularly when the luggage compartment is filled with luggage so as to make the spare time therein somewhat inaccessible, there may be a tendency or incentive on the part of the driver of the automobile and the attendant at a filling station to omit checking the air pressure level in the spare tire and/or filling the spare tire to the proper pressure when the driver of the automobile stops at a filling station to have the four running tires checked as to the air pressure therein.

Also, as well understood, despite the existence of air valves and the like, even the most modern pneumatic tire may, in course of time, become deflated to some extent. Consequently, if the checking or refilling of the spare tire of the automobile is omitted for a certain length of time, that spare tire will become deflated to less than a desirable or optimum or operative pressure. It is not unusual to neglect checking the air pressure in an automobile spare tire, merely because of the inaccessibility thereof as enclosed in the luggage compartment of the automobile, for a sufficient length of time so that the normal leakage or loss results in a substantial deflation of the spare tire below an air pressure level which would be desirable if it were necessary to replace one of the running tires with the spare such an undesirable condition frequently comes to light only when one of the four running tires is defective and it is required to replace it with the spare. Particularly if such an occurrence happens in a remote neighborhood or otherwise under conditions where the spare tire is the only or most desired remedy, finding the spare tire deflated or otherwise ineffectual is a situation to be avoided.

According to this invention, however, a device of the character described is particularly provided for checking and replenishing the air pressure in an automobile spare tire, and such device permits, indeed emphasizes, the checking or refilling of the air pressure of the spare tire by being mounted on the automobile at a point accessible from the outside of the car and, preferably, adjacent one of the rear wheels thereof, notwithstanding the fact that the spare tire itself is enclosed within the luggage compartment and/or surrounded by luggage and/or otherwise inaccessible; and the invention includes provision for supplementing or complementing the function of the air valve in a conventional pneumatic tire valve stem so that the air pressure within the spare tire itself can be checked or measured or replenished as necessary from outside the automobile and regardless of the fact that the spare tire itself is inaccessible, yet without needed alteration in the construction of a conventional tire and/or other alteration in connection with the conventional enclosed storage thereof within the automobile as may be desired.

The foregoing, and other, objects and advantages of this invention will be apparent from the following description, the accompanying drawings, and the appended claims.

In the drawing:
FIG. 1 is a view from the rear of an automobile showing a device embodying and for practicing this invention in place with regard to the spare tire stored within the luggage compartment of the automobile, and
FIG. 2 is a fragmentary showing on a somewhat larger scale and with parts broken away showing the installation of a device embodying and for practicing this invention, installed through the outer side wall of an automobile and connected to a spare tire within the luggage compartment thereof.

Referring to the drawings, in which like characters of reference refer to like parts throughout the several views thereof, an automobile is shown generally at 10 as having a spare tire 11 in the luggage compartment 12 thereof, which luggage compartment may include various pieces of luggage illustrated as at 13, and is normally closed by a lid or cover 14 in known manner and as well understood. As indicated in FIG. 1, and particularly with luggage compartment 12 filled with luggage 13 and with the cover 14 thereof closed and locked, spare tire 11 is in a position of sufficient inaccessibility as to prevent, or provide motivation or incentive against, opening cover 14 of luggage compartment 12 for the purpose of checking or replenishing the air pressure in spare tire 11 while the driver or filling station attendant is checking or replenishing the air supply in the running tires 15 of automobile 10, and this incentive against such operation is not lessened by the fact that the spare tire 11 may be so positioned in luggage compartment 12 as to increase the difficulty of reaching the conventional valve stem for the purpose of checking or replenishing the air pressure therein.

As noted in the drawing, a device embodying or for practicing this invention includes a flexible tube 20 for providing flow communication between the conventional air inlet valve stem of spare 11 (as described in more detail below) and a conventional automobile tire valve stem or nipple 21 mounted through the outer wall 22 of luggage compartment 12 of automobile 10 so as to be accessible from the outside thereof, as are accessible the conventional valve stems of the running tires 15 on the car. Thus, the operation of checking or replenishing the air pressure in spare tire 11, although enclosed within a locked compartment of the car, is both possible and indicated by the provision of nipple or stem 21 mounted through outer wall 22 of the car to be accessible from the outside thereof and without opening the lid 14 of luggage compartment 12 and notwithstanding the extent to which the placement of various luggage items 13 within compartment 12 may render inaccessible the spare tire 11.

In conformance with the foregoing, satisfactory results are achieved in accordance with this invention by providing, as noted in somewhat more detail in FIG. 2, flexible tube 20 as a hose or tube of convenient length and composed of rubber or plastic or impregnated fabric or other air-tight materials as well understood for air hoses, the length of flexible tube 20 being correlated with the distance from the outer wall 22 to the desired storage position of space tire 11, it being understood that this invention contemplates a plurality of sections of flexible tube 20, should this be desired, interconnected by couplings as hereinafter described.

As will be understood, spare tire 11 has a standard or conventional valve stem 30 penetrating through the rim 31 thereof and into the interior of rubber tire casing 32 (or into an inner tube within casing 32 if such is utilized) all in known manner. Valve stem 30, in perfectly conventional and known manner, includes an air valve, a portion of which is indicated at 35, which air valve is openable by depressing the pin portion indicated at 36 for the purpose of releasing air from within tire casing 32 or, alternatively, interjecting air under pressure into the interior of tire casing 32, all in known and well recognized conventional manner, and valve stem 30 includes a threaded nipple portion 37 for the conventional accommodation of a cap threaded thereon.

One end of flexible tube 20 carries an internally threaded coupling 40 adapted for threaded engagement with the threaded nipple portion 37 of valve stem 30. Merely for convenience in manipulation, coupling 40 is preferably attached to flexible hose 20 through a swivel clamp or coupling 41, all in known manner, so that the threaded portion 40 may be rotated to achieve the desired threaded engagement without rotating clamp portion 41 on hose 20, and, preferably, the hose coupling arrangement 40—41 is at least sufficiently conventional to fit the threaded nipple portion 37 of valve stem 30 for various standard makes of tires, as well understood in this art. Additionally, coupling 40 includes therein a central stationary pin or abutment 42 so positioned that, with coupling 40 threaded onto nipple 37 of valve stem 30, pin 42 will bear against and depress pin 36 to open and maintain in opened condition air valve 35 in valve stem 30, in known manner, so that as long as flexible tube or hose 20 is connected to valve stem 30 of spare tire 11, the air valve 35 therein is maintained open and, effectively, rendered inoperative as a containing closure for the air pressure in tire casing 32 of spare tire 11.

Additionally there is provided, at some conveniently accessible location outside automobile 10 (e.g., as may be desired, through a portion of the outer wall of luggage compartment 12 or through one or another of the sheet metal outer portions 22 of automobile 10) a threaded nipple 21. Preferably, nipple 21 is threaded for a substantial extent of its length, and is held in position through sheet metal wall 22 as by opposed nuts 45 and 46 with coacting gaskets and/or washers 47 to anchor nipple 21 in the side wall 22 of car 10 through a hole 48 therein while gaskets or washers 47 seal the hole against water leakage, etc.

Generally, the internal construction of nipple 21 is substantially like a conventional tire valve stem. That is, the outer end of nipple 21 includes a threaded portion 50 for accommodating a conventional threaded valve stem cap 51, and also includes a conventional tire air valve, part of which is indicated at 52 and having a depressible pin 53 to open the air valve—all substantially as indicated with the members 35 and 36 and valve stem 30 and preferably, as will be understood, arranged to accommodate a standard or conventional tire air valve.

The end of flexible tube or hose 20 opposite to the end carrying coupling 40 is provided, preferably, with a threaded coupling 55 arranged to engage the inner end of nipple 21 and affixed to the flexible portion of hose 20 as by a swivel clamp 56, in much the same manner as the members 40—41 are arranged at the opposite end of hose 20, with the exception, as will be understood, coupling 55 need not be provided with a pin or abutment 42, but may be merely the conventional type of hose coupling provided, as with tire pumps or otherwise, for engaging the threaded portion of a tire valve stem. As will be understood, also, hose 20 may be attached directly and permanently to nipple 21 without the interposition therebetween of a removable coupling, but the foregoing structure is preferred as providing a greater flexibility of installation of the device and as also providing for the utilization of more than one length of hose 20 coupled together with merely a plain nipple, should it be desired to have the spare tire quite remote from the point where nipple 21 penetrated the outer wall 22 for access from the outside of automobile 10.

In any case, it is preferred to use, so much as possible, various standard and well known and conventional couplings, nipples, etc., to assure an enhanced versatility of the device in accommodating different sizes and styles of automobiles and all standard brands of tires or valve stems or air valves or other replaceable parts without requiring special maintenance or manufacturing or installation techniques or parts.

As will be understood from the foregoing, when coupling 40 on hose 20 is affixed to threaded nipple 37 on valve stem 30 of spare tire 11, a central pin or abutment 42 depresses air valve pin 36 thereby opening or rendering ineffective the conventional valves in the spare tire. At the same time, however, air valve indicated at 52—53 at the outer end of nipple 21 takes over the function of valving the air pressure in spare tire 11, and this valve 52—53 in nipple 21 acts in the same manner as would the conventional valve in the valve stem 30 of spare tire 11, and is protected, in the conventional manner, as by cap 51 threaded onto nipple 21.

In checking or replenishing the air pressure in spare tire 11, then, a tire gauge or a conventional filling station air hose may be applied directly to the outer end of nipple 21, and, since both a tire gauge and a conventional air hose nozzle include a central abutment for depressing pin 53 in a conventional tire air valve, the operation is exactly the same in checking or replenishing the air pressure in spare tire 11 by application of a tire gauge or filling station air hose nozzle to the outer end of nipple 21 as would be the case if the air hose or tire gauge were applied directly to the outer end of valve stem 30 in spare tire 11. Thus, the valve 52—53 in nipple 21 takes over the valving function of the valve 35—36 in valve stem 30, which is being held open or inoperative by central pin or core 42 in coupling 40.

Accordingly, a device is provided embodying this invention whereby a readily accessible exterior valve stem nipple 21 is provided at any convenient or desired location outside the automobile, yet protected in the same manner as are the conventional valve stems on the automobile tires, through which exterior nipple 21 the air pressure level of a spare tire may be checked or replenished, as desired, virtually regardless of or independently of where the spare tire may be stored within the automobile, and a supplementary air valve is provided in the external nipple 21 for taking over the valving function of the inaccessible air valve in the spare tire 11, which air valve is maintained open or inoperative by the arrangement of pin 42 in coupling 40.

As also will be understood, except as qualified by, perhaps, inevitable minor leakages through the several couplings in air hose 20 with valve stem 30 or nipple 21 or several interconnected lengths thereof, a device embodying and for practicing this invention permits the satisfactory storage of the spare tire virtually anywhere in the automobile, while yet permitting, because of the external accessibility of nipple 21, checking or replenishing the level or air pressure therein at any time, and it is also to be understood within the contemplation of this invention that the supply nipple 21, need not, necessarily, be located externally of the automobile but might be located, if desired, under the hood or inside the car or in any other desired place which is normally accessible and to which access is normally made at a filling station in connection with checking the fuel and oil and coolant and tire air of an automobile.

It is also to be noted that, in accordance with this invention, a device is provided, substantially entirely, with a combination of standard or conventional or readily obtainable parts so that not only is the device adaptable to virtually all styles or makes of automobiles, but is also readily adaptable and useful with various makes of tires or spare parts; and the usefulness or adaptability or versatility of a device embodying and for practicing this invention is available (as by, for example, adding more or less links of hose 20 for various situations) without obtaining the manufacture of special parts or without particular or specialized installation or maintenance techniques, other than the provision of threaded nipple 21 with an air valve therein in conventional manner and merely drilling a hole, in any place desired, in the sheet metal wall 22 of an automobile for mounting nipple 21 therein as by nuts 45—46 and washers 47.

While the methods and forms of apparatus herein described constitute a preferred embodiment of the invention, it is to be understood that the invention is not limited to these precise methods or forms of apparatus, and that changes may be made therein without departing from the scope of the invention which is defined in the appended claims.

I claim:

1. In a pneumatic tire filling device of the character described for mounting through the side of an automobile for communication between the outside of said automobile and a spare tire located within said automobile, said spare tire having a conventional threaded filling valve stem including an air valve therein openable upon depressing, the combination which comprises a flexible air conduit for leading from a filling point outside said automobile to said spare tire valve stem, a threaded coupling at the end of said conduit adjacent said spare tire and adapted for connection to said valve stem for flow communication between said conduit and said spare tire, said coupling including means for depressing and opening said air valve in said spare tire valve stem, a nipple adjacent the opposite end of said conduit for flow communication between said conduit and the outside of said automobile, means for permanently mounting said nipple penetrating through the side of said automobile, each of the opposite ends of said nipple being threaded for receiving threaded couplings thereon, a threaded coupling at said opposite end of said conduit adapted for connection to one end of said threaded nipple inside said automobile, a threaded cap adapted for connection to the opposite end of said threaded nipple outside said automobile, a one-way air valve in said nipple for retaining pneumatic pressure within said spare tire notwithstanding said opening of said valve in said spare tire valve stem by said coupling and for admitting passage of air pressure through said nipple from the end thereof outside said automobile, said outside end of said nipple being adapted to receive in flow communication air pressure from a conventional filling air hose, and the size and threading of said nipple and the outside diameter thereof all being selected to accommodate and interfit with conventionally standard threaded air hose couplings as used in the automotive industry and said threaded couplings on opposite ends of said conduit being conventionally standard couplings as used in the automotive industry whereby said combination comprises conventionally standard interfitting parts.

2. The combination as recited in claim 1 in which said air conduit comprises a plurality of substantially identical longitudinal segments releasably interconnected by said standard threaded couplings and standard threaded nipples, whereby the effective length of said conduit inside said automobile is adjusted for different positions of said spare tire therein merely by selecting the number of said conduit segments and in the absence of specially constructed elements for different lengths of conduit.

References Cited in the file of this patent
UNITED STATES PATENTS

| | | |
|---|---|---|
| 2,257,498 | Hansen | Sept. 30, 1941 |
| 2,270,499 | Brewster | Jan. 30, 1942 |

FOREIGN PATENTS

| | | |
|---|---|---|
| 638,785 | Great Britain | June 14, 1950 |